Aug. 15, 1967 G. PETERSON 3,335,776
MEANS FOR IMPROVING THE TRACTION OF WHEELED VEHICLES
Filed Aug. 23, 1965
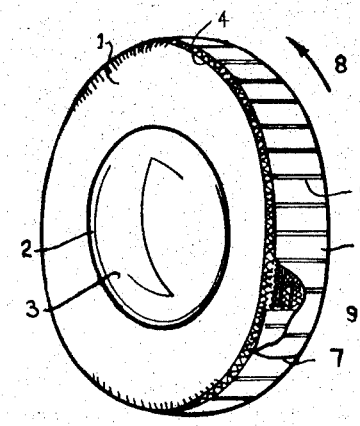
Fig. 1
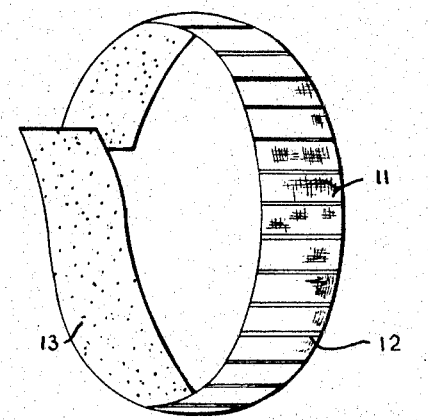
Fig. 2
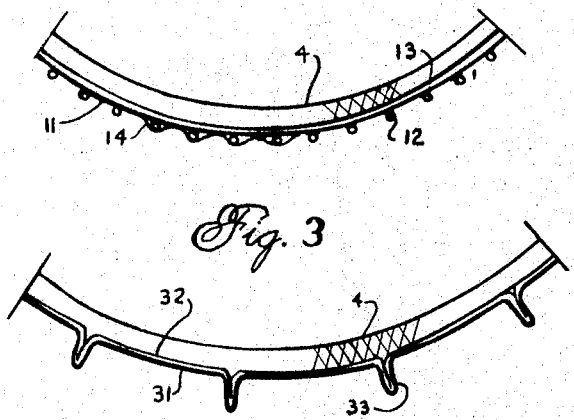
Fig. 3
Fig. 5
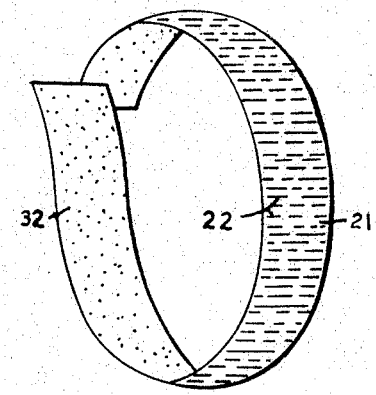
Fig. 4
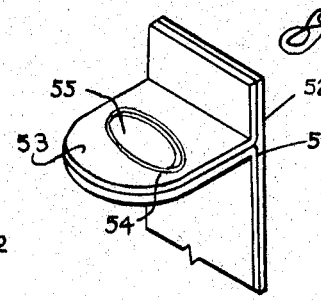
Fig. 7
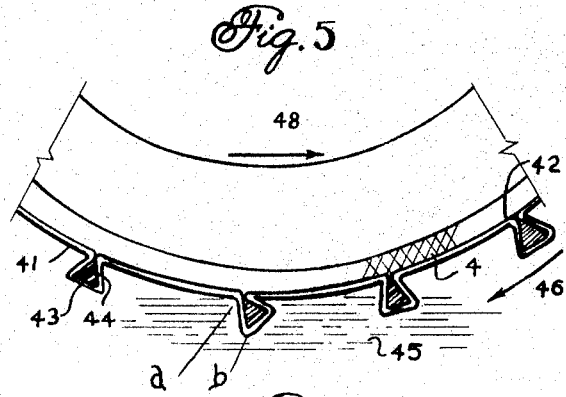
Fig. 6
INVENTOR.
Glen Peterson

United States Patent Office 3,335,776
Patented Aug. 15, 1967

3,335,776
MEANS FOR IMPROVING THE TRACTION OF WHEELED VEHICLES
Glen Peterson, 540 S. 83rd East Ave., Tulsa, Okla. 74112
Filed Aug. 23, 1965, Ser. No. 481,545
4 Claims. (Cl. 152—222)

This invention pertains to traction devices, to methods and means of momentarily improving the traction of wheeled vehicles, and in particular to attachments to automobile tires and the like to provide improved traction on ice, snow, wet and slippery roads.

Metallic chains and special tires, often referred to as snow tires, are now generally used for this purpose. While satisfactory for a great many situations, metallic chains are relatively expensive, somewhat difficult and annoying to put on the tires, especially in cold weather when they are most needed, and they wear out rapidly on a paved road once the snow or ice has melted. At the same time, special types of tires having improved traction in snow or on ice generally require the automobile owner to own two sets of tires; one for winter driving and one for summer driving.

In some areas of the country, owning two sets of tires is not economical; besides, these special tires are generally quite noisy and rough riding once the roads have been cleared and they become unnecessary.

Particularly are chains and special tires objectionable in those areas of the country which ordinarily have mild climates but which occasionally have snow storms and icy streets. In such areas the snow or ice usually lasts a day or two and is gone. In extreme circumstances a man may find himself in desperate need of chains to get to work on a morning after a snow storm but may have absolutely no need for such devices when he returns home at night. The sun may have melted the snow, or modern machinery may have been put to good use clearing the streets. To be obliged to apply chains and/or special tires to cars in these circumstances is both awkward and expensive.

It is the principal object of this invention to provide an improved traction device which can readily be attached to an automobile tire and which will provide for a reasonable length of time the necessary traction on slippery roads, such as those covered with ice, snow, water or mud. It is a second object to provide a traction attachment for an automobile tire which is so inexpensive that one can afford to let it wear out with each use. Other objects and advantages will become apparent after consideration of the drawings, wherein:

FIGURE 1 is a drawing in perspective showing the automobile wheel and tire with the improved traction device in place.

FIGURE 2 is a drawing showing a preferred form of disposable traction device in perspective view.

FIGURE 3 is a drawing in cross-section of the disposable traction device of FIGURE 2.

FIGURE 4 is a drawing in perspective view showing a disposable traction device having a slubbed surface.

FIGURE 5 is a drawing in cross-sectional view showing an alternative method of forming ridges in the disposable traction device.

FIGURE 6 is a drawing in cross-sectional view illustrating still another method used in forming traction ridges in the disposable traction device.

FIGURE 7 is a drawing in perspective view illustrating yet another method of forming traction tabs in the disposable traction tape.

FIGURE 1 shows the typical automobile wheel with tire 1, disc 2, hubcap 3 and tire tread 4. The disposable traction attachment 5 consists generally of a fabric or otherwise flexible tape having preferably a suitable pressure sensitive adhesive on one surface by means of which it can be readily fastened to the tire tread. Many pressure sensitive adhesives which can be used are well-known to commerce today and so need not be specified here. Such are covered in at least one book: "The Technology of Adhesives," by J. Delmonte, Reinhold, Technology, vol. I, pp. 191–206, and in numerous articles in the technical literature. It is of course necessary that the adhesive bond to the rubber tire be as strong as possible, and it is obvious that other forms of adhesives than the pressure sensitive type may be used, for example, the more modern epoxy and plastic adhesives. Pressure sensitive adhesives are, however, generally more convenient and easier to use than other types.

The outer surface of the disposable traction attachment, illustrated in FIGURE 1, is reasonably coarse and rough, and is preferably made of hard resilient fibers such as cotton, linen, hemp, wool, silk, etc., so as to provide the necessary wearing and traction qualities. In the preferred form, the disposable traction tape has the coarsest fibers running across the tire surface, as 6, in FIG. 1. The joint 7 where the two ends of the tape may overlap somewhat is preferably so made relative to the primary direction of rotation of the tire, as shown by arrow 8, that the outer layer of tape points in a direction opposite to the direction of rotation; however, this is of relatively minor importance.

Experimentally, it has been determined that a traction tape having a body of relatively fine cotton threads, as shown by 11, FIG. 2, and relatively coarse cross-threads 12, when covered on one surface with a pressure sensitive adhesive, will adhere very well to an automobile tire, and will wear for at least 25 miles on dry roads. On water wet roads, or smooth icy roads, this tape will provide reasonably good traction and will wear several times longer than on dry roads. Even after the tape has started to disintegrate, pieces of it cling to the tire and improve the traction on wet roads.

Perhaps the construction of this traction device is best understood by referring to FIG. 3 where it is shown in exaggerated cross-section. Again, 11 is the base fabric of relatively fine threads, and 12 a typical relatively coarse cross-fibre. In addition, 13 is the pressure sensitive adhesive by means of which the tape is fastened to the tire. 14 shows in much exaggerated form certain additional threads interwoven with 11 but which also pass through and around the coarse fibers 12 thereby fastening them to the body of the tape 11. Again, the coarse fibers 12 may be fastened to the body of the fabric 11 by means of thermal plastics or other suitable adhesives. In FIG. 3, 4 is again the tire tread.

The coarse cross-fibers 12 by means of which the tape gets most of its traction with the road surface can be made from quite a few materials such as cotton, hemp, wool, metal threads and combinations of fibers and metals. When metallic threads are used, the tape presents a hard sharp surface to an icy road which greatly enhances its tractive qualities. For wet roads it is important that the tape have a surface which readily wets with water. One of the things wrong with rubber tires is that water does not adhere strongly to them and therefore cannot make a strong tractive bond to a wet road surface. In the preferred form of traction tape, the body 11 of the tape is made of materials such as cotton which do wet readily and thereby increase the traction of the entire exposed tire surface against the wet road surface without recourse to the coarse fibers 12. This tractive bond between the base material 11 and the road may be still further improved by giving the base material a fibrous or fur-like surface, for example, by weaving the base material from threads having numerous fiber ends exposed, or by covering the exposed surface of the base material with cotton linters.

The traction tape should preferably be from an inch to three or more inches in width, depending upon the tire size. The traction tape on each tire should preferably be long enough to go completely around the tire and overlap several inches making a good joint with itself at the lap. For longer wearing applications, the traction tape may be made long enough to go around the tire several times so that after one thickness of the material has worn away, another is available.

As previously stated, the tape should preferably be wound in such a direction about the tire that the overlap is continually pushed in place as the wheel revolves; i.e., if the wheel turns counter clockwise, as shown, the tape should be applied clockwise.

The preferred method of applying the tape to the tire is to jack the wheel up, wire the tire surface off with a clean, oil-free damp cloth, and then unroll the previously rolled tape onto the tire as the wheel is slowly revolved, taking care to firmly press the tape in place. Alternatively, the tape can be unrolled and placed in position on the road preferably in front of the tire, and the tire rolled onto it as the car is driven forward.

An alternative form of traction tape, similar to the tape of FIGURES 2 and 3 is shown in FIG. 4. This tape is formed of a slubbed fabric well-known to commerce and is particularly easy to manufacture. In FIG. 4, 21 is the base or body fabric and 22 is the slubbing. In this instance, the coarse fibers are not necessarily regularly spaced, nor indeed need they be, to provide a good tractive surface which we expect to last only twenty-five or perhaps a hundred miles.

If desirable, the slubbing can also be given a metallic twist; i.e., fabric twine twisted or wound with metal threads. As noted, this provides a hard sharp cutting surface into ice and snow.

In all instances it is desirable that the traction tape be reasonably thin; otherwise, it may not stick tenaciously to the tire, as the weight or centrifugal force will cause the tape to pull away from the tire when such weight or force exceeds the adhesion of the tape. This action occurs over those portions of tire and traction tape which are not in contact with the road surface, and may be aggravated by the snow and ice which sticks to the tape. The portions of tire and tape at the point of contact with the road, however, provide a strong adhesive bond where the tractive force is exercised, since these portions of tire and tape are being pressed together by the weight of the car.

It has been found experimentally that when the tape begins to wear away so that only patches of it are left here and there, these same patches and adhesive provide considerable traction against smooth surfaces. Particularly, is this true when the adhesive picks up a little sand. Consequently, one form of traction device is a mixture of adhesive and sand and/or cotton linters which is painted or sprayed on the tire surface. Such a mixture can be conveniently packaged in an aerosol bomb and sprayed on the tire surface, as described in my U.S. Patent, No. 2,971,793, granted Feb. 14, 1961. This is an exceptionally easy form in which to apply a traction aid to a tire when but a momentary advantage on slick roads is required. Such is often the case in temperate climates where there are only occasional snows and freezes.

For roads covered with loose snow, the preferred form of traction aid has a little different construction than before described, such as those illustrated by FIGURES 5 and 6. Considering first the construction shown in FIGURE 5, 4 is again the tire tread, 31 is the basic body of the fabric, 32 is the pressure-sensitive adhesive coating, and 33 is a typical ridge formed in the outer surface of the tape by squeezing it together at given intervals. These ridges or tabs 33 are the coarse members of the traction device which dig into the soft snowy surface.

A further improvement of this arrangement is illustrated in FIG. 6 which shows in exaggerated cross-section an adhesive traction tape having a suitable pressure-sensitive adhesive 42 on the inner surface, generally using a suitable fabric 41, and employing long ridges or tabs 43. Each tab consists of an outer coating of fabric which is continuous with the main body of the tape, and a wedge or core 44. The latter is made of wood, pressed paper or any suitable material. 45 is the riding surface of the road and 46 is an arrow showing the direction of motion of the tire 1.

One feature of the ordinary tire chain, not generally appreciated, is that each cross chain drops down on the road somewhat ahead of the point of actual attachment to the tire. This provides a slight leverage in addition to the cutting action of the chain which enables the tire to pull itself along. This action is quite similar to that of the track-laying tractor or tank. The same type of advantage is here obtained for the adhesive traction tape through use of long folds or tabs as shown.

These tabs are attached to the tape body at $a$, FIG. 6, and hence to the tire, while they ride the road at $b$. The distance $ab$ acts as a lever arm and provides a pulling advantage. As the tire 1 turns in direction 46, $b$ anchors into the ice or snow, or against the wet road surface, so that the wheel must move forward in the direction 48.

The tabs for a disposable traction tape have been made by at least one additional means as shown in FIG. 7. The enlarged folded tab portion 53 is maintained by a metallic eyelet 54 which also serves as a tractive aid. 52 is the pressure-sensitive adhesive and 51 is the fabric body of the tape. There is a fold of the tape to form the tab and this fold is held together by the eyelet as shown. The eyelet which has a central opening 55 is preferably of an elongated oval shape so as to form a long metallic cutting surface to dig into the ice or snow on the road surface. It is obvious that the tab 53 could also be sewed together. It is also clear that the tabs may be reinforced with additional fabric pieces as may be desired and the eyelet or opening produced in the form of a fabric and thread reinforced button hole.

As the surface of a fabric attached to a tire wears rapidly when in contact with the highway an adhesive traction aid may lose tensile strength quite rapidly with use. For some longer wearing applications additional strength may be desirable. This can quite readily be accomplished for most tires without undue hardship or cost.

The average tire used by a passenger car usually has a tread which consists in part of a pattern of grooves over the tire wearing surface. The adhesive traction device can therefore be provided with a reinforcing pattern of strong fibers on the back adhesive-covered surface which fit into this pattern of grooves. In this way the reinforcing fibers are protected from road wear.

While the traction aids of this invention have generally been described in terms of fabrics made of fibers and associated materials, it is clear that the invention need not be limited to them. Metal tapes and foils may be used as, or in place of, fabrics; likewise, plastic materials in the form of sheets and strips may be used.

It is also true that the adhesive need not first be applied to the traction tape although so doing is an extremely convenient form in which to prepare and package the tractive aid. Nevertheless, the adhesive and tape may be packaged separately, and the adhesive may first be applied to the vehicle tire and the tape then wrapped around the adhesive-covered tire. Alternatively, adhesive and tape may be packaged separately and the adhesive applied to both tire and tape at the time of use. Again, the tape may be prepared with a coating of adhesive, prior to packaging, and an additional tube of adhesive placed in the package for application to the tire. There are many forms and combinations in which these articles can be prepared and packaged. Indeed, the tractive aiding material need not necessarily be in the form of a continuous tape or string. It can be in the form of fibers, strings and particles packaged with the adhesive as broadly disclosed herein. Accordingly, the invention is only limited by the appended claims:

I claim:

1. An expendable traction device for automobile tires consisting of a light-weight long flexible strip of fabric coated on at least one side with a pressure-sensitive adhesive and having a non-rubber tractive surface on at least one side, said strip of fabric being comprised in part at least of woven fibers which readily wet with water, which are generally harder than water, ice and snow but considerably softer than sand, gravel, asphalt, Portland cement and combinations thereof, the length of said strip of fabric being such as to generally encompass the outer tractive surface of said tire, said tractive surface being comprised in part of folds formed in said material, said folds protruding from one surface of said flexible strip, said fold having wedges which are generally as long as the folds are wide and which are placed between at least two layers of material forming said folds.

2. An expendable traction device for automobile tires consisting of a light-weight long flexible strip of fabric coated on at least one side with a pressure-sensitive adhesive and having a non-rubber tractive surface on at least one side, said strip of fabric being comprised in part at least of woven fibers which readily wet with water, which are generally harder than water, ice and snow but considerably softer than sand, gravel, asphalt, Portland cement and combinations thereof, the length of said strip of fabric being such as to generally encompass the outer tractive surface of said tire, said tractive surface being comprised in part of folds formed in said material, said folds protruding from one surface of said flexible strip, each of said folds having at least one metal eyelet.

3. A traction device, as in claim 2, said eyelets having an elongated oval shape with the long axis of said oval-shape eyelets running generally perpendicular to the length of said strip of material.

4. An expendable traction device for automobile tires consisting of a light-weight long flexible strip of fabric coated on at least one side with a pressure-sensitive adhesive and having a non-rubber tractive surface on at least one side, said strip of fabric being comprised in part at least of woven fibers which readily wet with water, which are generally harder than water, ice and snow but considerably softer than sand, gravel, asphalt, Portland cement and combinations thereof, the length of said strip of fabric being such as to generally encompass the outer tractive surface of said tire, said tractive surface being comprised in part of folds formed in said material, said folds protruding from one surface of said flexible strip, each of said folds having openings in the form of thread reinforced button holes.

References Cited

UNITED STATES PATENTS

| | | | |
|---|---|---|---|
| 1,036,493 | 8/1912 | Hill | 152—173 |
| 2,408,152 | 9/1946 | Porcelli | 152—208 X |
| 2,961,026 | 11/1960 | Stanton | 152—211 |

ARTHUR L. LA POINT, *Primary Examiner.*

C. W. HAEFELE, *Assistant Examiner.*